United States Patent [19]

Maher et al.

[11] Patent Number: 4,464,047
[45] Date of Patent: Aug. 7, 1984

[54] OVERHEAD MULTIPLE LAMP MOUNT CONSOLE FOR A VACUUM PRINTER

[75] Inventors: Robert J. Maher, Auburn Heights; Ronald Tooson, Inkster, both of Mich.

[73] Assignee: Douthitt Corporation, Detroit, Mich.

[21] Appl. No.: 475,760

[22] Filed: Mar. 16, 1983

[51] Int. Cl.³ .............................................. G03B 27/20
[52] U.S. Cl. ........................................ 355/93; 355/70
[58] Field of Search ................... 355/70, 91, 92, 93, 355/94

[56] References Cited

U.S. PATENT DOCUMENTS

| | | | |
|---|---|---|---|
| 2,270,578 | 1/1942 | Campbell | 355/94 |
| 2,287,228 | 6/1942 | Campbell | 355/93 |
| 2,376,416 | 5/1945 | Campbell | 355/73 |
| 2,494,282 | 1/1950 | Campbell | 355/93 |
| 3,106,145 | 10/1963 | Hutchins | 355/93 |

FOREIGN PATENT DOCUMENTS 747240  1/1944  Fed. Rep. of Germany ........ 355/91

*Primary Examiner*—Monroe H. Hayes
*Attorney, Agent, or Firm*—Cullen, Sloman, Cantor, Grauer, Scott & Rutherford

[57] ABSTRACT

In a vacuum printer for the graphic arts having a housing, blanket and glass frames upon the housing adapted to receive a negative and a light sensitive sheet, and an upright mounted upon and projecting above the housing, an overhead multiple lamp mount console is adjustably spaced from the glass frame and comprises an upright carriage guidably mounted upon the upright. A top frame overlies the glass frame and is secured to the carriage assembly. First and second lamp assemblies of different wattages span and are movably mounted upon a pair of tracks on the top frame adjacent their respective ends. The lamp assemblies are adapted for alternate movements upon the tracks so as to centrally overlie the glass frame, adapted for selective light exposure of the sensitized sheet. A third lamp assembly of a different wattage spans and is movably mounted upon additional tracks underlying and secured to a second lamp assembly adapted for movement thereon to centrally overlie the glass frame.

21 Claims, 6 Drawing Figures

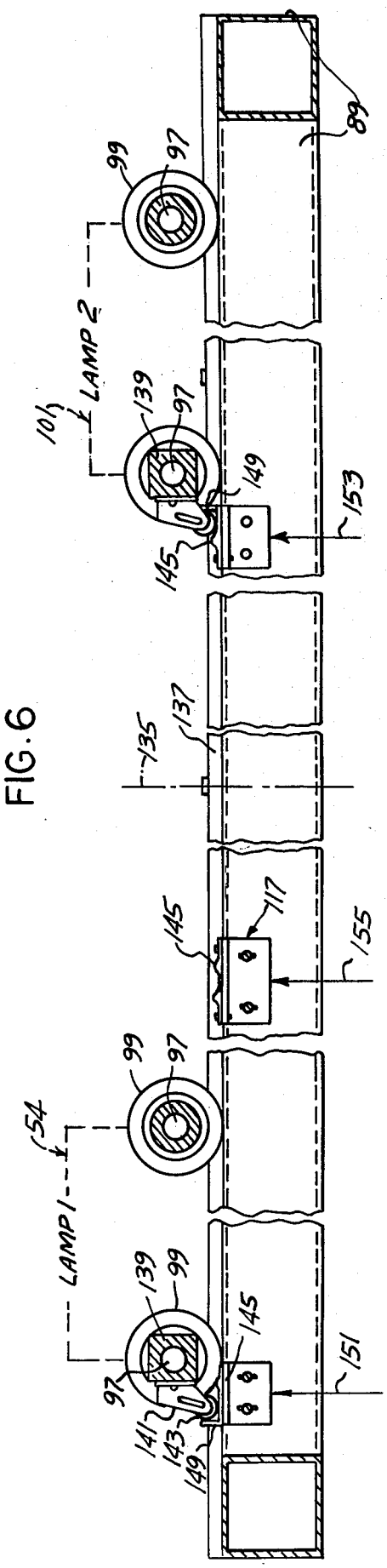
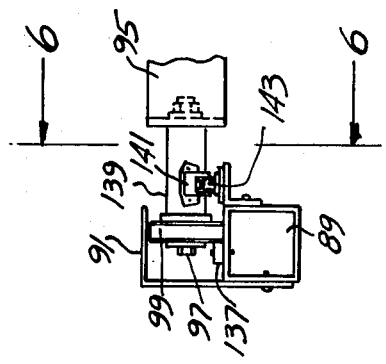
FIG. 6
FIG. 5

OVERHEAD MULTIPLE LAMP MOUNT CONSOLE FOR A VACUUM PRINTER

BACKGROUND OF THE INVENTION

Vacuum contact printing for the graphic arts is well known and wherein upon a bed there is normally mounted in a horizontal position a blanket frame which includes a flexible impervious blanket having a peripheral bead. A glass frame is positioned above the blanket frame and adapted for snug registry with its bead for defining a contact printing chamber between the glass frame and blanket. Hinges interconnect the glass frame with the blanket frame so that the glass frame may be pivoted or otherwise elevated with respect to the blanket frame in order to permit loading upon the blanket of a light sensitive sheet and thereover a negative. A vacuum source is provided having a conduit for providing vacuum communication to the printing chamber. After a predetermined period the flexible blanket of the blanket frame is drawn tightly and snugly up against the glass of the glass frame after which a high intensity light is presented to the frame assembly either in a horizontal or vertical position for exposing the sensitized sheet or plate.

THE PRIOR ART

Examples of that type of vacuum printer are shown in the following United States prior art patents of Applicant's assignee:

| PATENT | DATE | NAME |
| --- | --- | --- |
| 2,287,228 | June 23, 1942 | J. T. Cambell |
| 2,376,416 | May 22, 1945 | J. T. Cambell |
| 2,494,282 | January 10, 1950 | J. T. Cambell |
| 2,270,578 | January 20, 1942 | J. T. Cambell |
| 3,106,145 | October 8, 1963 | L. Hutchins |

Most of the foregoing patents show the relationship between a flexible blanket within a blanket frame and the glass of the overlying glass frame wherein the chamber between the two frames, sometimes referred to as a vacuum printing chamber, is evacuated so as to establish a good contact between the negative and the sensitized sheet and the glass frame at the time that it is exposed by the momentary application of the source of light.

Oftentimes in contact printers of the foregoing type, different sources of light intensity are required for a particular printing job in the graphic arts or in the making of plates and wherein some types of work a 5,000 watt lamp may be needed for illustration. Other types of work, a 500 watt lamp is all that is needed, and in other types of a 1,000 watt lamp or the like is required.

In each of these instances, depending upon the intensity of light exposure required, it is necessary to replace the existing light source from the vacuum printer with a light source corresponding to the one needed.

Thereafter, for the next type of job, it was necessary to change the lamp source again which required disassembling and dismantling the first selected lamp source and re-mounting a second lamp source so as to overlie the frame and be centrally positioned thereover for the exposure of the light sensitive sheet.

SUMMARY OF THE INVENTION

An important feature of the present invention is to provide an improved overhead multiple lamp mount console adapted for use in vacuum printers of this type and wherein a plurality of lamps of different intensity are initially mounte upon a supporting frame to overlie a printing bed and wherein any one of the multiple light sources may be selected and moved to a use position for a particular vacuum printing operation.

A further feature is to provide any such type of vacuum printer for the graphic arts with an upright support which is mounted upon and projects above the housing on one side thereof for the vacuum printer and upon which an overhead multiple lamp console is adjustably positioned and adapted to overlie the glass frame of the vacuum printer and be adjustably spaced therefrom.

A further feature is to provide an improved carriage assembly which is slidably mounted upon such upright and which mounts a laterally extending open top frame with tracks for adjustably supporting and mounting thereon a plurality of independent light sources of different wattage, any one of which may be selectively positioned centrally of the bed and glass frame for exposure of the sensitized sheet.

A further feature contemplates an improved carriage assembly which is slidably mounted upon the upright for mounting the overhead multiple lamp supporting framework. Said framework is counterbalanced. The mounting for the carriage assembly upon the upright includes a plurality of bearings interposed between the carriage assembly and upright so that the carriage assembly moves with a minimum of friction and with a minimum of effort to any desired position overlying the printing bed.

A further feature includes an open top frame which overlies and is parallel to the bed of the printer and includes a pair of opposed transverse tracks upon which at least two or more lamp assemblies of different intensity are adjustably mounted and wherein selectively any of the lamp assemblies can be moved to a central printing position.

A further feature contemplates the mounting upon at least one of the first mentioned light sources of an additional pair of transversely extending opposed tracks upon which a third light source of different intensity is adjustably mounted. Said third or additional light source remains normally in a non-use position and is adapted for forward adjustment so as to overlie the printer centrally thereof when its supporting light assembly has itself been moved to a central overlying position.

These and other features and objects will be seen from the following specification and claims in conjunction with the appended drawings.

THE DRAWINGS

FIG. 5 is a fragmentary end view of the front roller and track of FIG. 4, viewed from the far end and on an increased scale.

FIG. 6 is a fragmentary section taken in the direction of arrows 6—6 of FIG. 5.

It will be understood that the above drawings illustrate merely a preferred embodiment of the invention, and that other embodiments are contemplated within the scope of the claims hereafter set forth.

DETAILED DESCRIPTION OF AN EMBODIMENT OF THE INVENTION

Figure 1:
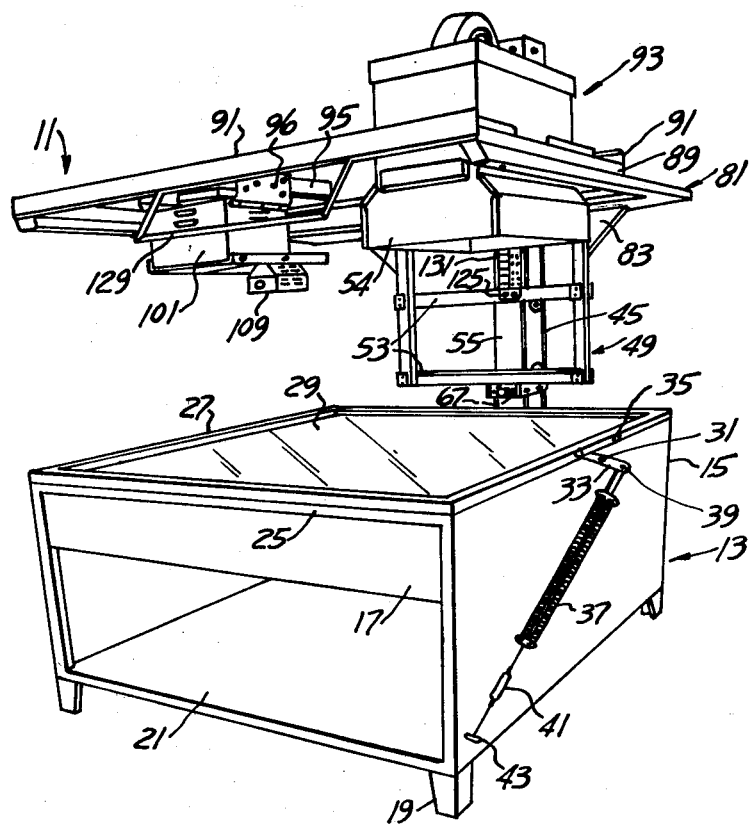
FIG. 1 is a front perspective view of the present overhead multiple lamp mount console as applied to the vacuum printer.
Figure 2:
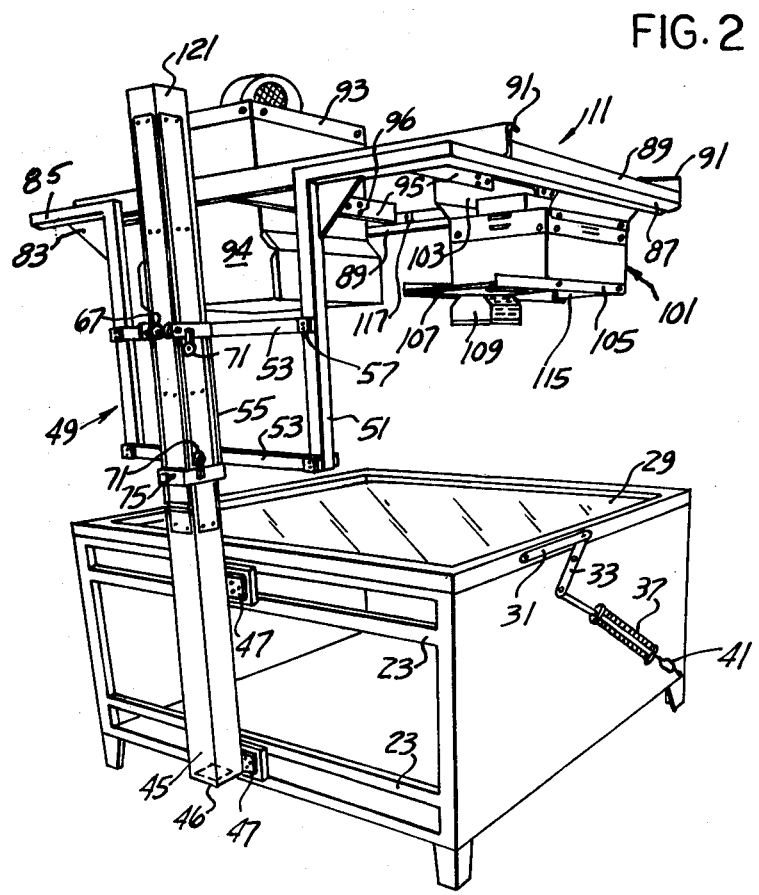
FIG. 2 is a rear perspective view thereof.

Referring to the drawings FIGS. 1 and 2, the present overhead multiple lamp mount console is shown at 11 adjustably overlying the vacuum printer 13. The present vacuum printer may be of any desired construction, such as disclosed in any of the foregoing listed patents or, in any event, any type of vacuum printer which includes a blanket frame and a glass frame defining therebetween a printing chamber which may be evacuated and over which must overlie adjustably a source of high intensity light.

The present invention is primarily directed to the overhead multiple lamp mount console rather than to the structure, function and operation of the vacuum printer.

Generally illustrative of vacuum printers of this type there is provided a housing 15 which includes a bed 17 mounted upon legs 19 and a bottom platform 21 upon which is usually mounted equipment used in conjunction with the operation of the vacuum printer including controls and a vacuum source as disclosed in the foregoing patents.

In the illustrative embodiment, the housing has across its rear as shown in FIG. 2 a plurality of parallel spaced cross members 23. As is conventional, a blanket frame 25 overlies the bed 17; and adjustably mounted upon the blanket frame 25 is a glass frame 27 including the glass 29.

Said glass frame is normally pivotally mounted intermediate its ends as by the pivots 31 and the associated toggle assembly 33 pivotally connected at 35 to the glass frame and pivotally connected at 39 to the spring 37 connected to turnbuckle 41 anchored at 43.

The turnbuckles arranged upon opposite ends of the housing provide a means of regulating the tension in springs 37 for controlling pivotal movements of the glass frame about its pivot mounts 31 upon the blanket frame thereunder or upon the housing 15.

Arranged preferably at the rear of the housing 15 and centrally thereof there is an upright 45, of tubular construction, preferably square in cross-section, including a bottom closure stop 46, fixedly secured to cross members 23 of the housing by a pair of vertically spaced mount brackets 47.

The present overhead lamp mount console includes the upright carriage assembly 49 which is adjustably and guidably mounted upon upright 45. The carriage assembly is in the form of an upright open frame having laterally spaced pairs of upright support arms 51 and interconnecting vertically spaced cross members 53 secured thereto at 57.

The frame further includes carriage plate 55 which is centrally interposed between the cross members 53 and secured thereto normally arranged closely adjacent the forward one side of the upright 45. A pair of parallel spaced oppositely directed U-shaped guide collars 59, 69 are secured to the upper and lower ends of the carriage plate 55 extending at right angles thereto. Each of the guide collars have a back plate 61 which is arranged upon the opposite one sides of the upright 45. Each of the guide collars 59, 69 include a pair of side plates 63 which extend along the other opposite sides of the upright.

Roller shafts 65 extend between the free ends of the respective oppositely directed collars 59, 69 and mount corresponding laterally spaced pairs of rollers 67 adapted for operative engagement with the opposite sides of the upright 45. Additional carriage guide roller bearings 71 are mounted upon the bearing arms 73 secured to the respective guide collars 59 and 69 and operatively bear against the opposite other sides of the uprights 45 as best shown in FIGS. 3 and 4.

A threaded tension control knob 75 extends through back plate 61 of the lower guide collar 59 and includes a Teflon tip 77 adapted for operative frictional engagement with the corresponding side of upright 45. When the knob is tightened, the carriage assembly may be secured in a particular vertically adjusted position relative to upright 45 and scale 131 thereon, FIG. 1.

Mounted upon each of the sides of the upright 45 are the elongated facing plates 79, preferably constructed of stainless steel and secured thereto. Said facing plates are interposed between the surfaces of the upright 45 on each of its sides and the corresponding rollers 67 and 71. It is by this construction that the upright frame 51, 53 which supports the top frame 81 is slidably and guidably mounted upon upright 45 with a minimum of friction.

Figure 3:
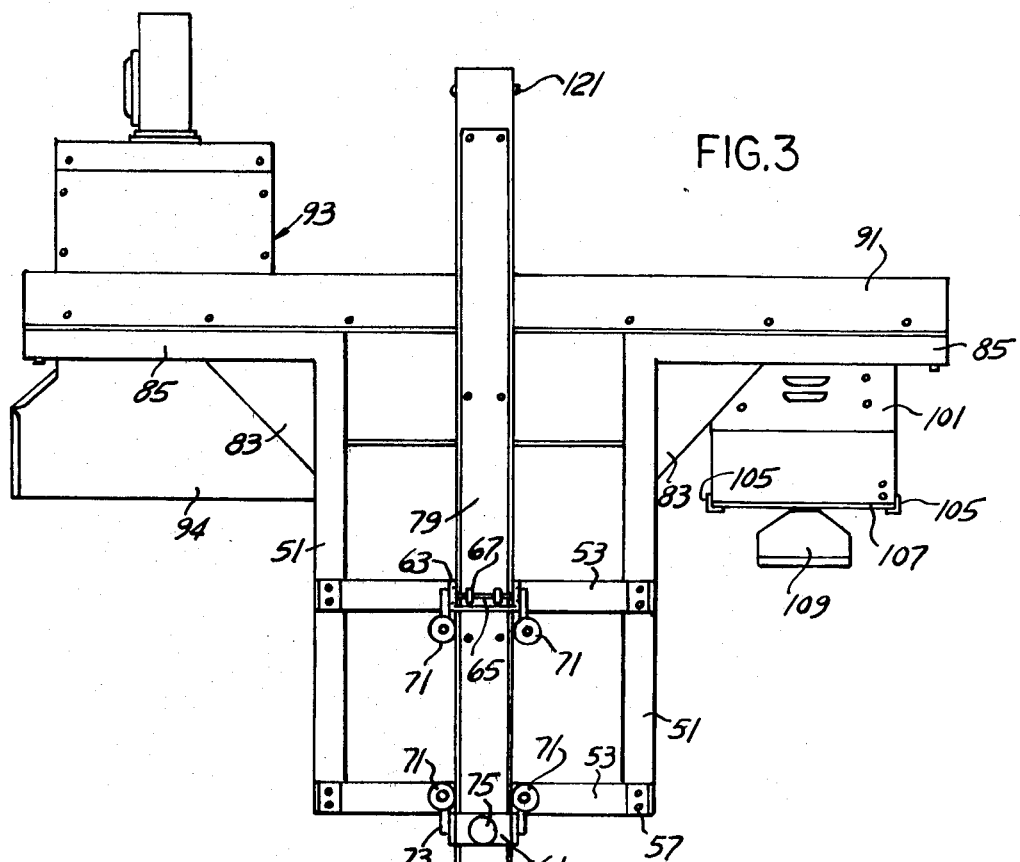
FIG. 3 is a fragmentary rear elevational view of the carriage assembly and open top frame adjustably mounting a plurality of different intensity light sources, said frame being adjustably mounted upon the upright shown in FIGS. 1 and 2.
Figure 4:
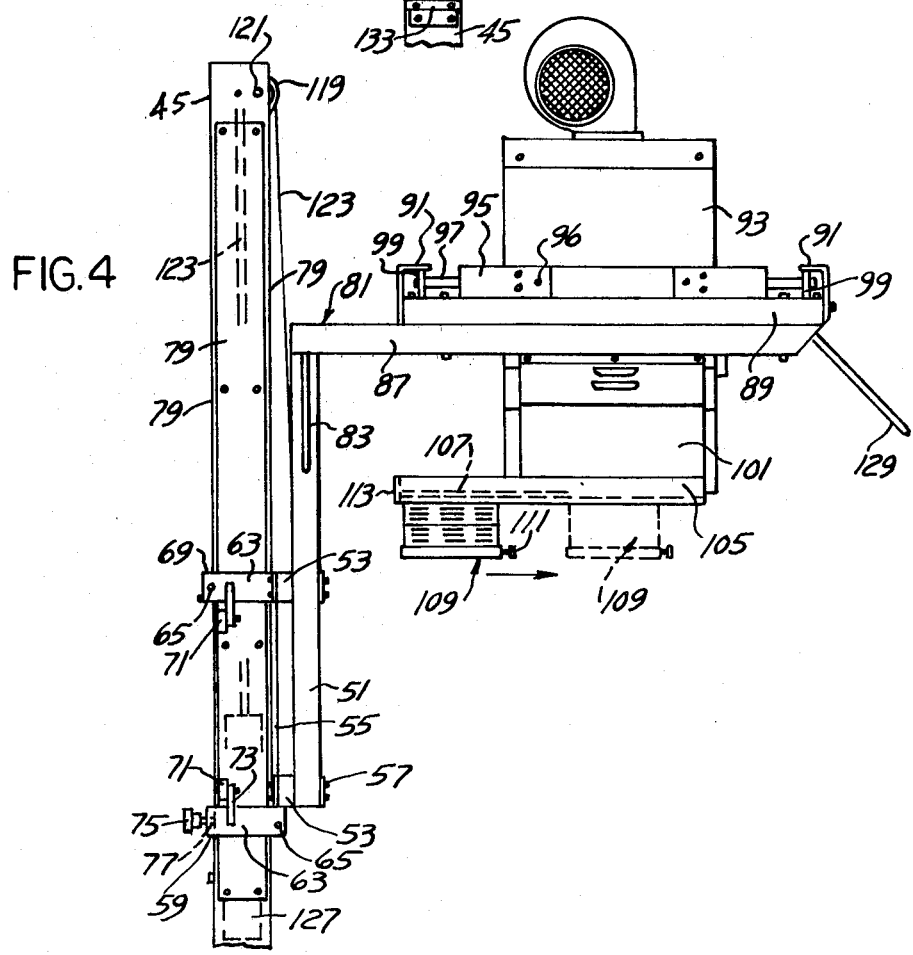
FIG. 4 is a right side elevational view thereof.

Top frame 81 is of a tubular construction and includes back frame members 85 which at their inner ends are fixedly secured to the upper ends of the support arms 51 and including the reinforcement plates 83 in FIGS. 3 and 4.

The open top frame 81 includes a pair of laterally spaced forwardly extending tubular side frame members 87 connected to the ends of frame members 85.

Open tubular lamp track 89 of generally rectangular shape spans the frame members 87 and is suitably secured thereto. A pair of opposed channel tracks 91 are arranged along the opposite sides of the lamp track 89 and are suitably thereto thereby defining with said track a pair of track ways for the adjustable mounting of at least a pair of lamp assemblies.

A first lamp assembly 93 of a predetermined first wattage as, for example, 5,000 watts, includes a depending hood 94. A lamp mounting ring 95 of general rectangular shape surrounds the first lamp assembly 93 and secured to the sides thereof as by fasteners 96, FIGS. 2 and 4. A pair of laterally spaced parallel bearing axles 97, one of which is shown, project from ring 95 at the ends thereof and journal the lamp bearings 99 which are projected into the opposed channels 91 and supportably mounted upon lamp track 89, FIG. 4.

The first lamp assembly 93 is normally positioned adjacent one end of the tracks 91. Second lamp assembly 101 of a predetermined second wattage as, for example, 500 watts is similarly mounted upon the opposite end portion of the opposed tracks 89–91 of the top frame 81. Here also is a lamp mount ring 95, FIGS. 1 and 2, which surrounds the second lamp assembly 101 and is similarly secured thereto as by the fasteners 96. Again, at the opposite ends of the second support ring 95 for the second lamp assembly there are additional laterally spaced pairs of bearing axles 97 journaling lamp bearings 99 positioned within the opposed channels 91 and movably mounted upon the track 89.

The securing of the support ring 95 around the second lamp assembly 101 includes the side lamp support plates 103, FIGS. 1 and 2 which are connected to opposite sides of the lamp assembly.

Upon the undersurface of the second lamp assembly 101 extending rearwardly thereof are a pair of opposed L-shaped tracks 105 upon which is movably mounted the slide support plate 107 from which depends third lamp assembly 109 of a predetermined third light intensity as, for example, 1,000 watts, sometimes referred to as a quartz light.

Centrally disposed handle 111 is arranged on the forward side of the third light assembly 109 and provides a means for manually sliding the third light assembly along the tracks 105 from the rearwardly displaced position to the central dash line position shown in FIG. 4 when it is desired to use this light source selectively.

A suitable stop 113, FIG. 4 is arranged at the rear of at least one of the tracks 105 for limiting rearward movement of plate 107. Spanning the forward ends of the tracks 105 is an additional stop 115 limiting forward adjustment of a third light assembly 109 to the dash line position shown in FIG. 4.

Centrally disposed upon one of the channels 91 relative to the lamp track 89 is an upright track stop 117, FIG. 2, adapted for registry selectively with the adjacent roller bearings 99 of either of the light assemblies 93 and 101. When either of these light assemblies are selectively or alternately moved into registry with stop 117, the corresponding light source will be directed downwardly towards a central portion of the glass frame 29.

When it is desired to use the third light source 109, it is first necessary to move the second light source 101 along tracks 91 into engagement with the stop 117 for centrally positioning thereof. Thereafter, the third light source 109 is manually moved forwardly into engagement with its corresponding stop 115 so as to properly position the third light assembly with respect to a central portion of the underlying glass frame 29.

The present overhead multiple lamp mount console is slidably and adjustably mounted upon the upright 45 with a suitable counterbalancing assembly interposed.

The counterbalancing assembly pulley 119 journalled at 121 upon the upper end of the upright 45 and projecting outwardly thereof, FIG. 4. Counterbalance flexible cable 123 extends around pulley 119 and depends downwardly and is anchored at one end as at 125 to the carriage plate 55, FIG. 1. The other end of the cable 123 extends downwardly within the upright and is suitably secured to the counterbalance weight 127 movably positioned therein.

To facilitate raising and lowering of the overhead light support console 11, there is provided centrally upon and depending from top frame 81 at the forward side thereof the lift handle 129 of U-shape. In view of the counterbalancing assembly, a very limited lifting or lowering force is required applied to the handle 129 for vertically adjusting the overhead light mount assembly with respect to the upright scale 131. Said scale is mounted upon the forward side of the upright 45 and is calibrated, such as between 30 to 65 inches for illustration, FIG. 1.

Upon the rear surface of the upright 45 is the transverse carriage stop 133 suitably secured thereto adapted to limit downward movement of the upright frame 51-53 and to prevent accidental engagement of any of the light assemblies with respect to the glass frame 29. Upward movement of the overhead light support framework is limited by the downward movement of the weight 127 when it comes into engagement with the bottom stop 46 of said upright, FIG. 2.

In operation, any of the three or more light sources shown, for illustration mounted upon the overhead top support frame 81 may be manually slid to the correct central position and the selected light source assembly properly energized by suitable switching mechanism, not shown. A suitable timer, not shown, provides the necessary time exposure for the sensitized sheet and negative interposed between the glass and blanket frames. Thus, there is provided in the present construction an overhead multiple lamp mount console which overlies the glass frame which adjustably supports and mounts a plurality of light sources of different predetermined intensity for selective use by the operator and wherein any of the light sources provided, of which three are disclosed, may be selectively moved to the centrally overlying position for exposure of the sensitized sheet used in the contact printing operation for use in the graphic arts.

The roller bearings 99 as supported upon the front track for the corresponding lamp assemblies 54 and 101 are shown in further detail and on an enlarged scale in FIGS. 5 and 6. The corresponding roller bearings 99 are movably mounted upon the top surface of the track 89 and have extreme non-use positions idle positions as at 151 and 153 and a center of frame light expose position 155.

The respective roller bearings 99 are positioned adjacent the elongated roller guide strip 137 upon track 89. One of the roller supports from each light assembly includes axle support 139 from which depends a roller bracket 141 supporting the roller 143.

In addition to the stop 117, FIG. 6 having a roller catch 145 thereon, there are additional roller catches 145 spaced from the center position 155 and mounted upon the track 89 which include the upright stops 149.

Lamp assemblies 54 and 101 are schematically shown in non-expose idle positions at opposite ends of the track 89 held in place by the roller catches 145 and corresponding stop 149. In each of these positions, the corresponding roller 143 is retainingly engaged by the corresponding stop and roller catch.

The exposed position for either of the lamp assemblies is achieved by rolling either lamp assembly inwardly off of the idler positioners at the ends of the tracks engaging the lamp assembly with the center position stop 117 and wherein the corresponding roller 143 is in registry with the central roller stop 117-145. This automatically centers the particular lamp assembly with respect to the vacuum frame and holds it into this position as shown at 155, FIG. 6.

Having described our invention, reference should now be had to the following claims:

We claim:

1. In a vacuum printer for the graphic arts having a housing, a blanket frame and a glass frame overlying the housing and adapted to receive therebetween a negative and an underlying light sensitive sheet;

an upright mounted upon, secured to and projecting above said housing upon one side thereof;

an overhead multiple lamp mount console overlying said glass frame and adjustably spaced therefrom comprising;

an upright carriage assembly slidably and guidably mounted upon said upright;

an open top frame parallel to overlying and spaced from said glass frame and upon one side secured to said carriage assembly;

a pair of opposed parallel spaced lamp tracks mounted upon and spanning said top frame and extending lengthwise of said glass frame;

a first lamp assembly of a predetermined first wattage spanning and movably mounted upon said tracks adjacent one end thereof;

a second lamp assembly of a predetermined second wattage spanning and movably mounted upon said tracks adjacent the other end thereof;

said first and second lamp assemblies adapted for alternate movement upon said tracks so as to centrally overlie said glass frame, adapted for selective light exposure of said sensitized sheet.

2. In the vacuum printer of claim 1, a locator stop upon one of said tracks intermediate its ends alternately engageable with said first and second lamp assemblies upon inward movement thereof.

3. In the vacuum printer of claim 1, a second pair of opposed spaced tracks mounted upon and underlying said second lamp assembly extending rearwardly thereof and at right angles to said top frame tracks;

and a third lamp assembly of a predetermined third wattage spanning and movably mounted upon said second tracks adjacent one end thereof, said third lamp assembly adapted for movement thereon towards the other end of said second tracks so as to centrally overlie said glass frame when said second lamp assembly has been moved upon its tracks to a central position.

4. In the vacuum printer of claim 2, a second pair of opposed spaced tracks mounted upon and underlying said second lamp assembly extending rearwardly thereof and at right angles to said top frame tracks;

and a third lamp assembly of a predetermined third wattage spanning and movably mounted upon said second tracks adjacent one end thereof;

said third lamp assembly adapted for movement thereon towards the other end of said second tracks so as to centrally overlie said glass frame when said second lamp assembly has been moved upon its tracks to a central position.

5. In the vacuum printer of claim 1, a counter-balancing means movably positioned within said upright and connected to said carriage assembly, for maintaining said top frame and depending light assemblies in any predetermined position above said glass frame.

6. In the vacuum printer of claim 5, said counter-balancing means including a weight within said upright, a pulley journaled upon the upper end of said upright and projecting upwardly thereof:

and a cable extending over said pulley and at its ends connected to said weight and to said assembly.

7. In the vacuum printer of claim 6, a stop mounted upon said upright adjacent its lower end in the path of downward movement of said carriage assembly limiting downward movement of said top frame and depending light assemblies;

a bottom stop upon said upright;

engagement of said weight with said bottom stop limiting upward movement of said top frame.

8. In the vacuum printer of claim 1, said carriage assembly including an upright frame at its upper end ridigly connected to said open top frame;

an upright carriage plate secured centrally upon said upright frame loosely positioned upon one side of said upright;

parallel spaced oppositely directed guide collars of U-shape secured to the top and bottom of said carriage plate and extending at right angles thereto;

first roller means interposed between the ends of said collars operatively engaging first opposite sides of said upright;

and second roller means secured upon opposite sides of said guide collars in operative engagement with the second opposite sides of said upright at right angles to said first opposite sides.

9. In the vacuum printer of claim 8, said first and second roller means including roller bearings supported and journaled upon said collars for loosely and guidably mounting and retaining said carriage plate upon said upright for movement therealong with a minimum of friction.

10. In the vacuum printer of claim 8, elongated facing plates mounted upon and along the sides of said upright and secured thereto, said first and second roller means bearing against said facing plates.

11. In the vacuum printer of claim 10, said facing plates being of stainless steel.

12. In the vacuum printer of claim 1, clamp means on said carriage assembly in operative engagement with said upright for securing said carriage assembly in a predetermined vertical position along its height.

13. In the vacuum printer of claim 8 clamp means upon one of said guide collars adapted for operative frictional engagement with said upright for securing said carriage assembly in a predetermined vertical position along its height.

14. In the vacuum printer of claim 13, said clamp means including a tension control knob threaded through said collar and having a Teflon tip adapted for frictional retaining engagement with said upright.

15. In the vacuum printer of claim 5, a lift handle upon and depending from said top frame upon one side hereof to facilitate manual vertical adjustments of said top frame and depending light assemblies.

16. In the vacuum printer of claim 1, the mounting of said first and second lamp assemblies upon said tracks including a mounting ring of rectangular shape surrounding and secured to opposite sides of each lamp assembly;

laterally spaced pairs of parallel bearing axles secured to and projecting from the ends of said rings respectively;

and roller bearings journaled upon said axles projecting into and supported upon said lamp tracks.

17. In the vacuum printer of claim 3, the mounting of said third lamp assembly upon said second tracks including a mount plate supporting said third lamp assembly and interposed between and slidably mounted said second tracks.

18. In the vacuum printer of claim 3, the mounting of said first and second lamp assemblies upon said tracks including a mounting ring of rectangular shape surrounding and secured to opposite sides of each lamp assembly;

laterally spaced pairs of parallel bearing axles secured to and projecting from the ends of said rings respectively;

and roller bearings journaled upon said axles projecting into and supported upon said lamp tracks;

the mounting of said third lamp assembly upon said second tracks including a mount plate supporting said third lamp assembly and interposed between and slidably mounted said second tracks.

19. In the vacuum printer of claim 3, said first, second and thrid lamp assemblies having wattages respectively of 5,000, 500 and 1,000.

20. In the vacuum printer of claim 16, a locator stop catch upon one of said tracks intermediate its ends defining a lamp expose position;
a roller bracket depending from one of each of said pairs of roller axles mounting a roller alternately registerable with said stop catch for locating either lamp assembly in said expose position.

21. In the vacuum printer of claim 20, additional roller stop catches upon said track outwardly of said first stop catch, registerable with said rollers, said additonal roller stop catches including a positive stop.

* * * * *